United States Patent
Gallot et al.

(10) Patent No.: US 11,479,287 B2
(45) Date of Patent: Oct. 25, 2022

(54) METHOD AND DEVICE FOR HEATING A VEHICLE MEMBER

(71) Applicant: Autoliv Development AB, Vargarda (SE)

(72) Inventors: Eric Gallot, Trie-Chateau (FR); Alexander Gulde, Haimhausen (DE); Thomas Letierce, Vouneuil s/Biard (FR)

(73) Assignee: Autoliv Development AB, Ogden, UT (US)

( * ) Notice: Subject to any disclaimer, the term of this patent is extended or adjusted under 35 U.S.C. 154(b) by 552 days.

(21) Appl. No.: 16/479,349

(22) PCT Filed: Jan. 18, 2018

(86) PCT No.: PCT/EP2018/051196
§ 371 (c)(1),
(2) Date: Jul. 19, 2019

(87) PCT Pub. No.: WO2018/134299
PCT Pub. Date: Jul. 26, 2018

(65) Prior Publication Data
US 2019/0351931 A1    Nov. 21, 2019

(30) Foreign Application Priority Data
Jan. 19, 2017   (FR) ...................................... 1750397

(51) Int. Cl.
*B62D 1/06*     (2006.01)
*B60N 2/56*     (2006.01)

(52) U.S. Cl.
CPC ........... *B62D 1/065* (2013.01); *B60N 2/5678* (2013.01)

(58) Field of Classification Search
CPC ...... B62D 1/065; B62D 1/046; B60N 2/5678; H05B 1/0236; H05B 1/0238; H05B 3/20;
(Continued)

(56) References Cited

U.S. PATENT DOCUMENTS 8,803,037 B2 *    8/2014   Paxton ................... B62D 1/065
                                                         219/204
2009/0001778 A1    1/2009   Nathan et al.
(Continued)

FOREIGN PATENT DOCUMENTS

| CN | 108574995 A | * | 9/2018 | ........... B60H 1/2218 |
| DE | 102008020391 A1 | | 1/2009 | |
| WO | WO2012170527 A2 | | 12/2012 | |

OTHER PUBLICATIONS

International Search Report of the International Searching Authority for PCT/EP2018/051196 dated Apr. 19, 2018.
(Continued)

*Primary Examiner* — Shawntina T Fuqua
(74) *Attorney, Agent, or Firm* — Matthew D. Thayne; Thayne and Davis LLC

(57) ABSTRACT

A method of heating a vehicle member, comprising at least one first electrical heating unit and at least one second electrical heating unit, the method comprising:
   a first step with a step consisting of supplying current to the first electrical heating unit until at least one zone reaches a setpoint temperature, and with a step consisting of determining a first electrical energy supplied to the first electrical heating unit,
   a second step with a step consisting of supplying the first electrical heating unit in order to keep the priority area of the member at the setpoint temperature and with a step consisting of delivering to the second electrical
(Continued)

heating unit a second electrical energy, calculated based on the first electrical energy.

14 Claims, 2 Drawing Sheets

(58) Field of Classification Search
CPC ........ H05B 3/34; H05B 3/146; H05B 3/0042; H05B 2203/006; H05B 2203/033; H05B 2203/017; H05B 2203/013; H05B 2203/011; H05B 2203/003; H05B 2203/014

See application file for complete search history.

(56) References Cited

U.S. PATENT DOCUMENTS

| | | | |
|---|---|---|---|
| 2012/0055914 A1* | 3/2012 | Goto | B60N 2/5685 |
| | | | 219/520 |
| 2012/0305540 A1 | 12/2012 | Paxton et al. | |
| 2015/0028015 A1 | 1/2015 | Park et al. | |
| 2015/0158367 A1* | 6/2015 | Jeong | B60H 1/004 |
| | | | 701/36 |
| 2016/0016495 A1* | 1/2016 | Tüskes | B60N 2/5685 |
| | | | 297/180.12 |

OTHER PUBLICATIONS

Translation of the International Search Report of the International Searching Authority for PCT/EP2018/051196 dated Apr. 19, 2018.

\* cited by examiner

METHOD AND DEVICE FOR HEATING A VEHICLE MEMBER

The present invention generally relates to a method and device for heating a vehicle member, such as a heated steering wheel, or a heated seat.

Document U.S. Pat. No. 8,066,324 describes a heating device for a vehicle seat, but the system is complicated because it requires a plurality of temperature sensors, which increases the complexity of the control unit (which must therefore be capable of receiving a plurality of measuring lines), and the associated costs.

One purpose of the present invention is to respond to the disadvantages of the documents of the prior art mentioned above and in particular, first of all, to propose a method and a device for heating a vehicle member, that makes it possible to warm up a zone or limited surface are of the member to a particular temperature, while remaining simple to manufacture and without consuming too much electricity.

Thus a first aspect of the invention relates to a method of heating a vehicle member such as a steering wheel or a seat, comprising at least one first electrical heating unit and at least one second electrical heating unit, the method comprising:
- a first step with a phase consisting of supplying an electrical current to said at least one first electrical heating unit until the at least one priority area of the member reaches a temperature setpoint, and with a phase consisting of determining a first electrical energy supplied to said at least one first electrical heating unit in order to reach the temperature setpoint,
- a second step with at least one phase consisting of delivering to said at least one second electrical heating unit a second electrical energy, calculated based on the first electrical energy supplied to said at least one first electrical heating unit during the first step.

The method according to the invention proposes to supply the second heating unit during the second step only by taking into account the energy supplied to the first heating unit, which simplifies the overall architecture (no need for a temperature sensor in the zone heated by the second heating unit). Moreover, it is possible to choose to supply the first unit during the first step with an electrical power that is different from the one supplied to the second unit, which provides a solution to meet particular needs. During the first step, the method therefore calculates the integral as a function of the time of the electrical power supplied to the first unit in order to determine the first energy supplied. During the second step, the method defines either the heating time (if the heating power is predetermined), or the heating power (if the heating time is predetermined) applied to the second heating unit, in order to fully supply the second energy to the second unit. Updating the heating time or the heating power during the second step can also be considered for example if the available power varies during said second step.

Advantageously, said at least one first electrical heating unit is arranged in order to heat said at least one priority area, and said at least one second electrical heating unit is arranged in order to heat a zone of the member other than the priority area.

Advantageously, the first step consists in supplying said at least one first electrical heating unit with a majority of the current.

Advantageously, the second step comprises at least one phase consisting of supplying an electrical current to said at least first electrical heating unit to maintain said at least one priority area of the member at the temperature setpoint. Supplying the first heating unit can be considered if the temperature must be maintained at a minimum value, for example if said second step lasts a long time. Said maintaining at temperature requires only a small amount of current, the priority being able to go to the second heating unit.

Advantageously, a supply line, defining a maximum supply power, being provided to supply said at least one first electrical heating unit and said at least one second electrical heating unit, and:
- during the second step, said at least one first electrical heating unit receives no more than a predetermined portion of the maximum supply power, and said at least one second electrical heating unit receives the available balance of the maximum supply power.

Such a distribution of the powers allocated to the two units makes it possible to optimize the speed of increase in temperature of the other zone without affecting the temperature regulation of the priority area. Indeed, the power available for the other zone during the second step varies with a guaranteed minimum: if during the regulation of the priority area, the first unit is not consuming electrical power, said electrical power not consumed by the first unit is allocated to the second unit which enables it to be heated more quickly. At the same time, the regulation of the priority area is not affected because a given electrical power is allocated to it by priority if necessary. In other words, the priority area has one portion of the available power, up to a limit, and then the other zone benefits from the balance (the remainder of the available power), but the priority area can also not consume anything if the temperature falls within the regulation limits and in that case, all available power is allocated to the other zone. For example, if heating units are equivalent or equal, the first unit can be supplied with no more than 50% of the maximum available power in order to maintain the priority area at temperature.

Advantageously, during the first step, said at least one first electrical heating unit receives at least 60% of the maximum supply power, and/or said at least one second electrical heating unit is supplied with no more than 40% of the maximum supply power. Very preferentially, during the first step, said at least one first electrical heating unit is supplied with at least 70% of the maximum supply power, and the applicant has found that said value makes it possible to quickly reach the setpoint temperature, without greatly degrading the heating of other zones of the member by said at least one second heating unit. During said first step, there is no assignment of power from one unit to the other, each consuming the power allocated thereto.

Advantageously, during the second step, said at least one second electrical heating unit is supplied taking into account only the first electrical energy supplied to the said at least one first electrical heating unit during the first step, optionally modulated by a heating multiplier coefficient. In other words, the method only follows this parameter to deliver current to the second heating unit. This makes it possible to dispense with a temperature sensor for the second heating unit. The multiplier coefficient may be fixed or variable, for example based on the temperature inside the vehicle. Furthermore, the multiplier coefficient may or may not take into account the power delivered to the first unit that could influence the heating of the second zone when the two zones are close to one another.

Advantageously, the heating method comprises a third step, beginning after the complete supply of the second electrical energy to said at least one second electrical heating unit, and consisting of:

maintaining said at least one priority area of the member at the setpoint temperature while supplying said at least one first electrical heating unit with the first maintenance electrical power, supplying said at least one second electrical heating unit with a second maintenance electrical power calculated based on the first maintenance electrical power supplied to said at least one first electrical heating unit during said third step. Even during the third step, control of the electrical current of the second unit is only done on the basis of the current delivered to the first heating unit. There is therefore still no need for temperature acquisition on other zones of the member.

Advantageously, said at least one first electrical heating unit comprises a first electrical resistance, said at least one second electrical heating unit comprises a second electrical resistance, and during the third step, the second maintenance electrical power supplied to said at least one second electrical heating unit is equal to the first maintenance electrical power modulated by a ratio of the value of the second electrical resistance divided by the value of the first electrical resistance. It can be provided to modulate the second electrical maintenance power relative to the first electrical maintenance power solely with the resistance ratio, but it can also be provided to modulate the second electrical maintenance power also with a coefficient of surface area covered by the heating units, a thermal conduction coefficient, etc.

Advantageously, said at least one first electrical heating unit comprises a first electrical resistance, said at least one second electrical heating unit comprises a second electrical resistance, and the second electrical energy is equal to the first electrical energy modulated by a ratio of the value of the second electrical resistance divided by the value of the first electrical resistance. It can be provided to modulate the second electrical energy relative to the first electrical energy solely with the resistance ratio, but it can also be provided to modulate the second electrical energy also with a coefficient of surface area covered by the heating units, a thermal conduction coefficient, etc.

Advantageously, any step of measuring a temperature during the first step or during the second step is a step of measuring a temperature of said at least one priority area. Therefore, the heating method only takes into account the temperature of the priority area in order to control the heating units.

Advantageously, the first step is implemented only if the setpoint temperature is more than 15° C. higher than the temperature of said at least one priority area. For example, an automatic startup of the heating method can be provided if such a temperature differential is determined.

A second aspect of the invention concerns a heating device of a vehicle member such as a steering wheel or a seat, comprising:
  at least one first electrical heating unit,
  at least one second electrical heating unit,
  at least one control unit arranged in order to control said at least one first electrical heating unit and said at least one second electrical heating unit,
  at least one temperature sensor arranged in order to measure a temperature of the priority area of the member,
characterized in that said at least one control unit is arranged in order to:
  determine a first electrical energy supplied to said at least one first electrical heating unit on the basis of a temperature measured by said at least one temperature sensor,
  and deliver to said at least one second electrical heating unit a second electrical energy, calculated based on the first electrical energy.

Advantageously, the heating device comprises said at least one temperature sensor as the sole temperature sensor.

A third aspect of the invention concerns a vehicle steering wheel comprising a heating device according to the second aspect, and/or arranged in order to be heated by the method according to the first aspect.

A fourth aspect of the invention concerns a vehicle seat comprising a heating device according to the second aspect, and/or arranged in order to be heated by the method according to the first aspect.

A fifth aspect of the invention concerns an automotive vehicle comprising a vehicle steering wheel according to the third aspect and/or at least one seat according to the fourth aspect.

Other features and advantages of the present invention will be seen more clearly from the following detailed description of an embodiment of the invention provided by way of a non-limiting example and illustrated by the appended drawings, wherein:

FIG. 1 represents a steering wheel comprising:
  a hub arranged in order to attach the steering wheel to a steering column,
  a rim,
  three spokes connecting the hub to the rim.

The rim comprises two priority areas 10, and two other zones 20. A first priority area 10 is arranged substantially at 10 o'clock, and a second priority area 10 is arranged at 2 o'clock. In other words, the two priority areas 10 are arranged at the places where the driver most often places his hands while driving the vehicle (position "10:10").

When the vehicle is cold, it is advantageous to heat the two priority areas 10 in a preferential manner, in order to quickly achieve a sensation of comfort for the driver. The other zones 20 will then be heated less quickly.

To that end, the heating device according to the invention comprises:
  a first heating unit arranged in the rim at two priority areas 10,
  a second heating unit arranged in the rim at two other zones 20.

Figure 3:
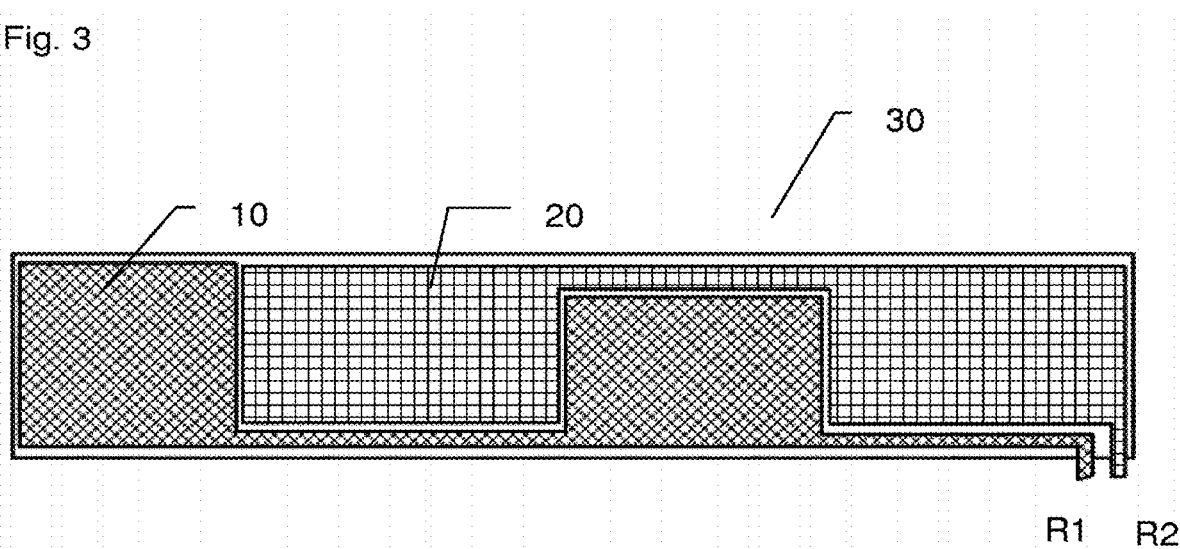
FIG. 3 represents a heating layer for a heating device according to the invention.

For example, implanting a resistive layer 30 beneath the outer layer of the rim of the steering wheel can be considered as diagrammed in FIG. 3, with two electrical resistances each located facing zones to be heated (a first electrical resistance R1 facing priority areas 10, and a second electrical resistance R2 facing other zones 20). When the first zone is bisected by the second zone as is the case in this example, there is an electrical continuity (electrical conductors) between the two electrical elements dedicated to each zone. Each continuity influences the temperature of the zone that it passes through when it is supplied with current. Depending on the amount of influence, the heating and maintenance coefficients can take into account the impact of these electrical continuities.

Due to the presence of a rotatable electrical joint at the hub of the steering wheel, the supply power SP is limited to a maximum supply power MSP and it is essential to calibrate the total value of the heating R1 and R2 resistances R1 and R2 as a function of said maximum supply power. By taking this limitation into account, the invention proposes to supply the first resistance R1 and the second resistance R2 according to a particular strategy, in order to quickly heat the priority areas 10.

Figure 1:
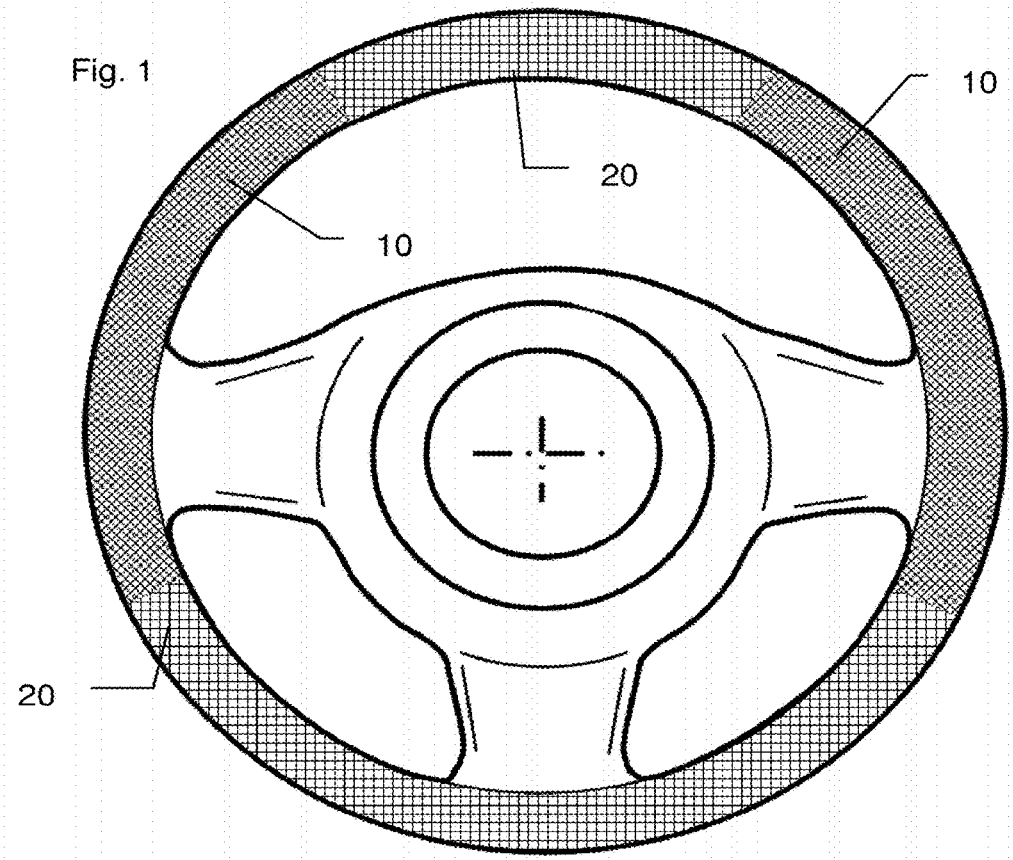
FIG. 1 represents a simplified view of a steering wheel comprising a heating device according to the present invention, capable of implementing the heating method according to the present invention.
Figure 2:
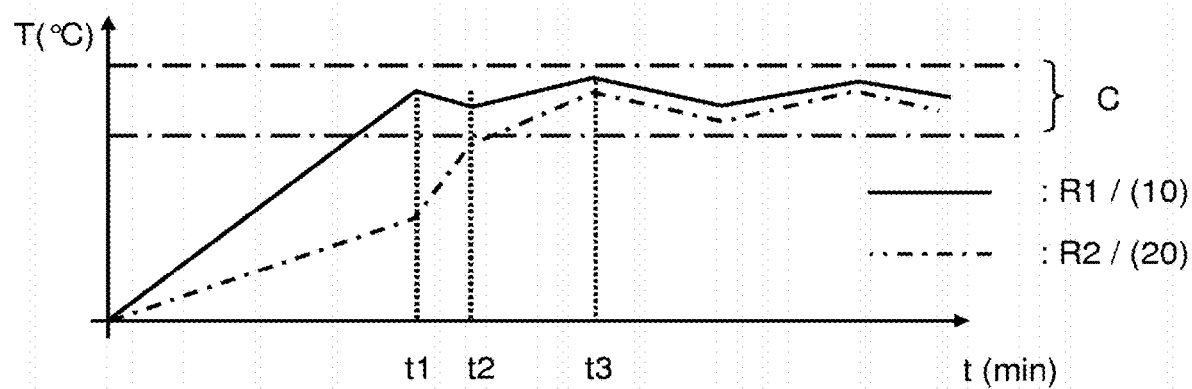
FIG. 2 represents a diagram of temperatures measured on the steering wheel of FIG. 1, when the method according to the present invention is implemented.

FIG. 2 represents a heating example implementing the method according to the present invention. The Y-axis represents the temperatures measured at the surface of a steering wheel equipped with a heating device according to the present invention, and the X-axis represents time.

The solid-line curve represents the temperature in priority areas 10, at the first resistance R1, and the curve in a dash-dot line represents the temperature in the other zones 20, at the second resistance R2.

A temperature setpoint C is defined between two horizontal segments, for example between 25° C. and 28° C. If the vehicle steering wheel is cold (for example 0° C.), then the heating method can be triggered, either automatically or by the driver.

During a first step, between t0 and t1, the first resistance R1 is supplied in such a way as to receive a first electrical power P1 that is a majority of the maximum supply power MSP (for example 70% of the maximum supply power MSP), and the remainder of the available supply power SP is sent to the second resistance R2 (therefore 30% of the maximum supply power MSP in this example) as a second electrical power P2. Therefore MSP=P1+P2.

It will be noted that between t0 and t1 the temperature in the priority areas 10 increases more quickly than the temperature in the other zones 20. During said first step, the heating method also accounts for a first electrical energy EE1 supplied to the first resistance R1 (EE1, in joules, is the product of the first electrical power P1 in watts multiplied by the time (t1−t0) in seconds).

At the time t1, the priority areas 10 are at the temperature setpoint C, and a second step of regulating the first resistance R1 to maintain said temperature setpoint then begins. For this a predefined maximum power is available for the first resistance. The remainder of the available electrical power is then sent to the second resistance R2, thus MSP still equals P1+P2. However, the electrical energy sent to said second resistance R2 is a second electrical energy EE2, calculated based on the first electrical energy EE1 determined during the first step. Indeed, said first electrical energy has made it possible to raise the priority areas 10 to the temperature setpoint C with measurement of the temperature, said first electrical energy EE1 can therefore reliably be taken into account in order to determine the quantity of energy to supply to the second resistance R2. Of course, the first electrical energy EE1 can be weighted to find the second electrical energy EE2, based on a ratio of the resistances R2/R1, or a ratio of surface area to be heated, another experimental ratio or the internal temperature of the vehicle or the temperature of the resistances for example. Parameters associated with the structure of the steering wheel such as the presence of decorative elements made of different materials can also be taken into account.

As regards the first resistance R1, it is supplied solely to maintain the temperature setpoint. Thus the supply thereof can be limited to 50% or less of the maximum supply power, and can even supply the second resistance R2 with all of the supply power when the first resistance R1 has no need to be supplied, such as between the times t1 and t2. Between the times t2 and t3, the first resistance R1 needs to be supplied, which reduces the energy supply to the second electrical resistance R2, and the temperature thereof increases less rapidly. However, at time t3, all the electrical energy EE2 has been delivered to the second electrical resistance R2, which therefore has reached the temperature setpoint.

It should be noted that the method according to the invention does not take into account the temperature in the other zones 20. Only the temperature in the priority areas is taken into account, in order to control the first electrical resistance R1, and only the first electrical energy EE1 is taken into account in order to control the second electrical resistance during the second step between t1 and t3, after deducting the needs for regulating/maintaining the temperature of the first electrical resistance R1.

Once the second electrical energy EE2 has been completely delivered to the second electrical resistance R2, a third step begins, that of maintaining the temperature setpoint of the whole steering wheel. During said third step, the first electrical resistance R1 is controlled on the basis of the temperature thereof, and the second electrical resistance R2, is controlled in the same way as the first resistance R1, simply by multiplying the power P1 by a maintenance coefficient, to determine the power P2 to supply it.

In other words, the second electrical power P2 is an affine function of the first electrical power P1 supplied to the first electrical resistance R1.

If R1 and R2 are the same value, or must each heat an equivalent surface area and the steering wheel is constructed similarly in both zones to be heated, supplying the same electrical power to both resistances R1 and R2 can be considered. Thus, it is possible to guarantee that both zones will be maintained at a temperature during the same interval by using only one temperature sensor.

Figure 4:
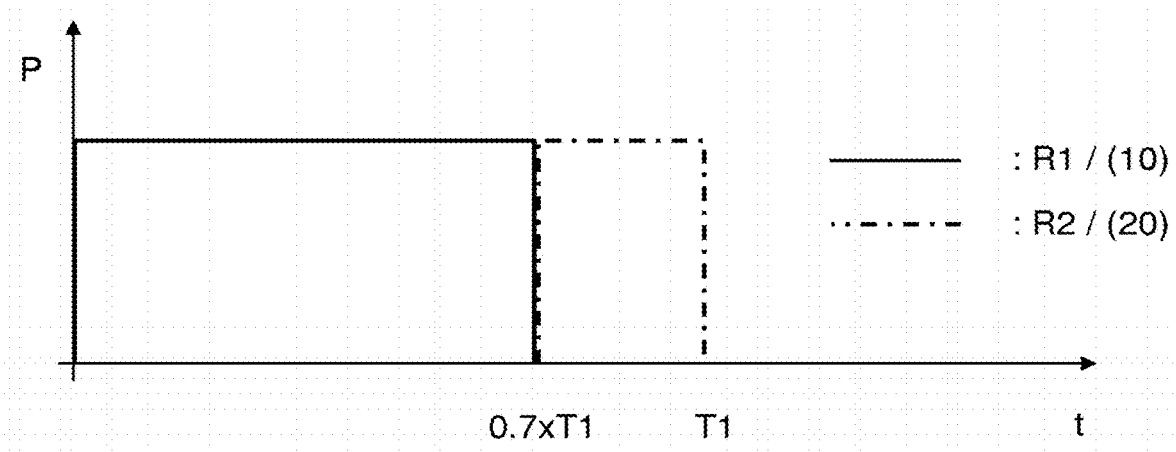
FIG. 4 represents an example of supplying current during a first step of the method according to the invention.

FIG. 4 represents an example of supplying resistances R1 and R2 with current during the first heating step. During a time period T1, which will be repeated throughout the first step, only the first resistance R1 is supplied with all the available electrical power between the start of the period up to 70% of said period T1. Then, it is the resistance R2 that is supplied with all available electrical power to the end of the period T1.

As a result, over the period T1, the first resistance R1 receives about 70% of all available power, and the second resistance R2 receives the balance, i.e. about 30% of all available power. Obviously this principle can be repeated during the second step and/or during the third step of heating of the method according to the invention.

Moreover, chopping the current during the phases of supplying each resistance can be considered, in order to finely regulate the intensity of the current passing through each resistance, by regulating the chopping frequency.

It will be understood that various modifications and/or improvements obvious to the person skilled in the art can be made to the different embodiments of the invention described in the present description without going beyond the scope of the invention as defined by the appended claims.

The invention claimed is:

1. A method of heating a vehicle member, such as a steering wheel or a seat, comprising at least one first electrical heating unit and at least one second electrical heating unit, the method comprising:

a first step with a phase consisting of supplying a current to said at least one first electrical heating unit until the at least one priority area of the vehicle member reaches a setpoint temperature, and with a phase consisting of determining a first electrical energy supplied to said at least one first electrical heating unit in order to reach the setpoint temperature, a second step with at least one phase consisting of delivering to said at least one second electrical heating unit a second electrical energy, calculated based on the first electrical energy supplied to said at least one first electrical heating unit during the first step.

2. The heating method according to claim 1, wherein the second step comprises at least one phase consisting of supplying electrical current to said at least first electrical heating unit to maintain said at least one priority area of the vehicle member at the setpoint temperature.

3. The heating method according to claim 1, a supply line, defining a maximum supply power, being provided to supply said at least one first electrical heating unit and said at least one second electrical heating unit, and wherein:

during the second step, said at least one first electrical heating unit receives no more than a predetermined portion of the maximum supply power, and said at least one second electrical heating unit receives the balance of the maximum supply power.

4. The heating method according to claim 3, wherein:

during the first step, said at least one first electrical heating unit receives at least 60% of the maximum supply power.

5. The heating method according to claim 1, wherein during the second step, said at least one second electrical heating unit is supplied taking into account only the first electrical energy supplied to said at least one first electrical heating unit during the first step, optionally modulated by a heating multiplier coefficient.

6. The heating method according to claim 1, comprising a third step, beginning after the complete supply of the second electrical energy to said at least one second electrical heating unit, and consisting of:

maintaining said at least one priority area of the vehicle member at the setpoint temperature while supplying said at least one first electrical heating unit with the first maintenance electrical power, supplying to said at least one second electrical heating unit a second maintenance electrical power calculated based on the first maintenance electrical power.

7. The heating method according to claim 6, said at least one first electrical heating unit comprising a first electrical resistance, said at least one second electrical heating unit comprising a second electrical resistance, and wherein, during the third step, the second maintenance electrical power supplied to said at least one second electrical heating unit is equal to the first maintenance electrical power modulated by a ratio of the value of the second electrical resistance divided by the value of the first electrical resistance.

8. The heating method according to claim 1, said at least one first electrical heating unit comprising a first electrical resistance, said at least one second electrical heating unit comprising a second electrical resistance, and wherein the second electrical energy is equal to the first electrical energy modulated by a ratio of the value of the second electrical resistance divided by the value of the first electrical resistance.

9. The heating method according to claim 1, wherein any step of measuring a temperature during the first step or during the second step is a step of measuring a temperature of said at least one priority area.

10. The heating method according to claim 1, wherein the first step is implemented only if the setpoint temperature is more than 15° C. higher than the temperature of said at least one priority area.

11. A heating device of a vehicle member such as a steering wheel or a seat, comprising:

at least one first electrical heating unit, at least one second electrical heating unit, at least one control unit arranged in order to control said at least one first electrical heating unit and said at least one second electrical heating unit, at least one temperature sensor arranged in order to measure a temperature of the priority area of the vehicle member, wherein said at least one control unit is arranged in order to:

determine a first electrical energy supplied to said at least one first electrical heating unit based on a temperature measured by said at least one temperature sensor, and deliver to said at least one second electrical heating unit a second electrical energy, calculated based on the first electrical energy.

12. The heating device according to claim 11, comprising said at least one temperature sensor as sole temperature sensor.

13. The heating device according to claim 11 in combination with a vehicle seat or steering wheel.

14. The heating device according to claim 11 in combination with a vehicle.

* * * * *